United States Patent
Abdulla et al.

(10) Patent No.: US 7,840,706 B1
(45) Date of Patent: Nov. 23, 2010

(54) WAKE-ON-LAN DESIGN IN A LOAD BALANCED ENVIRONMENT

(75) Inventors: Ayaz Abdulla, San Jose, CA (US); Sameer Nanda, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 208 days.

(21) Appl. No.: 11/948,982

(22) Filed: Nov. 30, 2007

(51) Int. Cl.
*G06F 15/16* (2006.01)
*G06F 3/00* (2006.01)

(52) U.S. Cl. .......................... 709/245; 709/250; 710/9

(58) Field of Classification Search .................. 709/245, 709/250; 710/8, 9
See application file for complete search history.

(56) References Cited

U.S. PATENT DOCUMENTS

| | | | | |
|---|---|---|---|---|
| 5,661,719 | A * | 8/1997 | Townsend et al. ........... | 370/216 |
| 6,052,733 | A * | 4/2000 | Mahalingam et al. ....... | 709/235 |
| 6,874,147 | B1 * | 3/2005 | Diamant ...................... | 719/328 |
| 2002/0078213 | A1 * | 6/2002 | Chang et al. ................. | 709/229 |
| 2002/0112051 | A1 * | 8/2002 | Ullman ........................ | 709/224 |
| 2006/0126619 | A1 * | 6/2006 | Teisberg et al. ............. | 370/389 |
| 2007/0025253 | A1 * | 2/2007 | Enstone et al. .............. | 370/235 |
| 2009/0133040 | A1 * | 5/2009 | Stevens, IV ................. | 719/315 |

* cited by examiner

*Primary Examiner*—Ranodhi N Serrao
(74) *Attorney, Agent, or Firm*—Patterson & Sheridan, LLP (57) ABSTRACT

A method and system for supporting Wake-on-LAN (WOL) in a team of network interface cards (NICs) in a computing device is disclosed. One embodiment of the present invention sets forth a method, which includes the steps of programming each of the NICs on the team with a team Media Access Control (MAC) address after having backed up the NIC MAC addresses of the NICs but before the computing device enters a low power state, and causing modification of address resolution protocol (ARP) caches associated with a plurality of client devices coupled to the team of NICs to use the team MAC address.

14 Claims, 6 Drawing Sheets

WAKE-ON-LAN DESIGN IN A LOAD BALANCED ENVIRONMENT

BACKGROUND OF THE INVENTION

1. Field of the Invention

Embodiments of the present invention relate generally to network communications and more specifically to a method and system for performing wake-on-LAN functionality in a load balanced environment.

2. Description of the Related Art

Unless otherwise indicated herein, the approaches described in this section are not prior art to the claims in this application and are not admitted to be prior art by inclusion in this section.

Performance and reliability are key requirements for modern computer networks. One approach is to create a "team" of network interface cards ("NICs") to handle the networking needs of a computing device. The team operates in a load-balanced environment to avoid overloading of any one specific NIC on the team and also employs techniques such as "failover" to redirect network traffic from one unreliable NIC to other reliable NICs on the team. These NICs are transparent to the operating system of the computing device, since the operating system only recognizes a single Transmission Control Protocol/Internet Protocol (TCP/IP) binding to the team.

Figure 1:
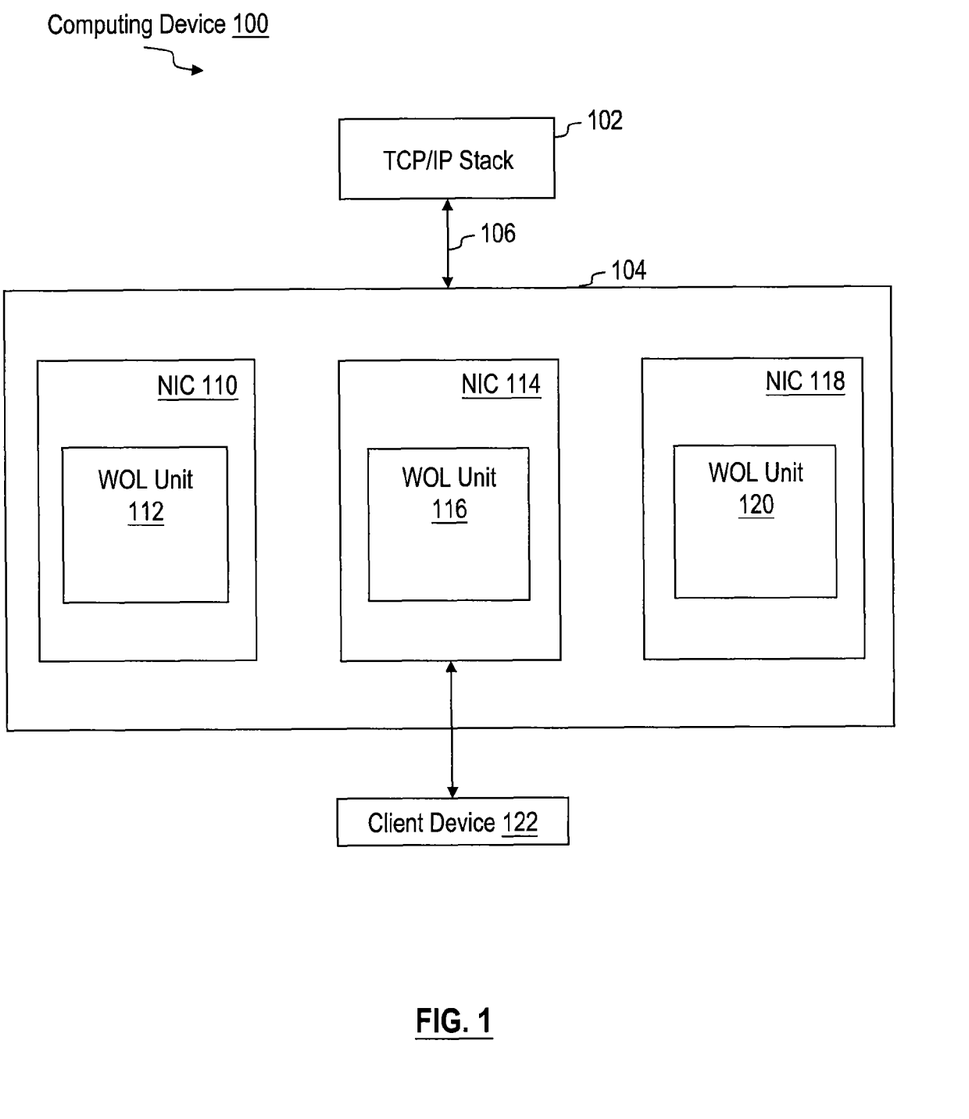
FIG. 1 is a simplified block diagram of a computing device with a TCP/IP stack, which has a single TCP/IP binding to a team of NICs in a switch independent load balanced environment.

However, problems arise when the Wake-on-LAN (WOL) protocol needs to be performed through the team configuration. To illustrate, FIG. 1 is a simplified block diagram of a computing device 100 with a TCP/IP stack 102, which has a single TCP/IP binding 106 to a team 104 including NIC 110, NIC 114, and NIC 118 in a switch independent load balanced environment. Each NIC is configured with its own unique MAC address, but only one of the three MAC addresses is chosen to represent the team 104. For simplicity, the binding 106 maps an IP address to the MAC address of the team 104. It should however be apparent to a person with ordinary skills in the art to recognize that the team 104 can be configured to have multiple IP addresses while still having one team MAC address. Suppose the NIC 110, NIC 114, and NIC 118 are associated with MAC addresses M1, M2, and M3, respectively. Suppose further that the team 104 is associated with the MAC address M3. To wake up the computing device 100, one typical WOL approach is to either direct or broadcast a "magic" packet, a packet including replicated copies of the MAC address associated with the target computing device to be woken up, to the target computing device. Here, in a team configuration, the magic packet contains multiple copies of the MAC address of the team 104, M3. If WOL unit 120 determines that the MAC address in the magic packet matches the MAC address of the NIC 118, then it causes the computing device 100 to wake up. Alternatively, another WOL approach to wake up the computing device 100 is to direct or broadcast a pattern match packet, a packet including a specific pattern, to the team 104. Here, if the WOL unit 120 finds a match between the pattern in the received packet and the pre-programmed pattern in the NIC 118, then it also causes the computing device 100 to wake up.

One problem occurs if the NIC 118 is in failover (due to a faulty NIC or a down link in the team 104) before or after the computing device 100 enters the low power state. The other NICs in the team 104 do not recognize any of the WOL packets (e.g., magic packets or pattern match packets), because the other NICs only match the WOL packets with their own MAC Addresses, resulting in the computing device 100 continuing to stay in the low power state. Another problem occurs if the NIC 118 is the only NIC with the broadcast filter enabled in the team 104 and the NIC 118 again is in failover after the computing device 100 enters the low power state. Without the normal failover operation, the other NICs in the team 104 ignore any broadcast WOL packet to wake up the computing device 100, and the computing device 100 remains stuck in the low power state.

As the foregoing illustrates, what is needed is a method and system for implementing the WOL protocol in a load balanced environment to address at least the problems set forth above.

SUMMARY OF THE INVENTION

A method and system for supporting Wake-on-LAN (WOL) in a team of network interface cards (NICs) in a computing device is disclosed. One embodiment of the present invention sets forth a method, which includes the steps of programming each of the NICs on the team with a team Media Access Control (MAC) address after having backed up the NIC MAC addresses of the NICs but before the computing device enters a low power state, and causing modification of address resolution protocol (ARP) caches associated with a plurality of client devices coupled to the team of NICs to use the team MAC address.

One advantage of the disclosed method and system is to address the potential problems of not waking up a computing device under certain failover conditions in a team of network interface cards.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 2A:
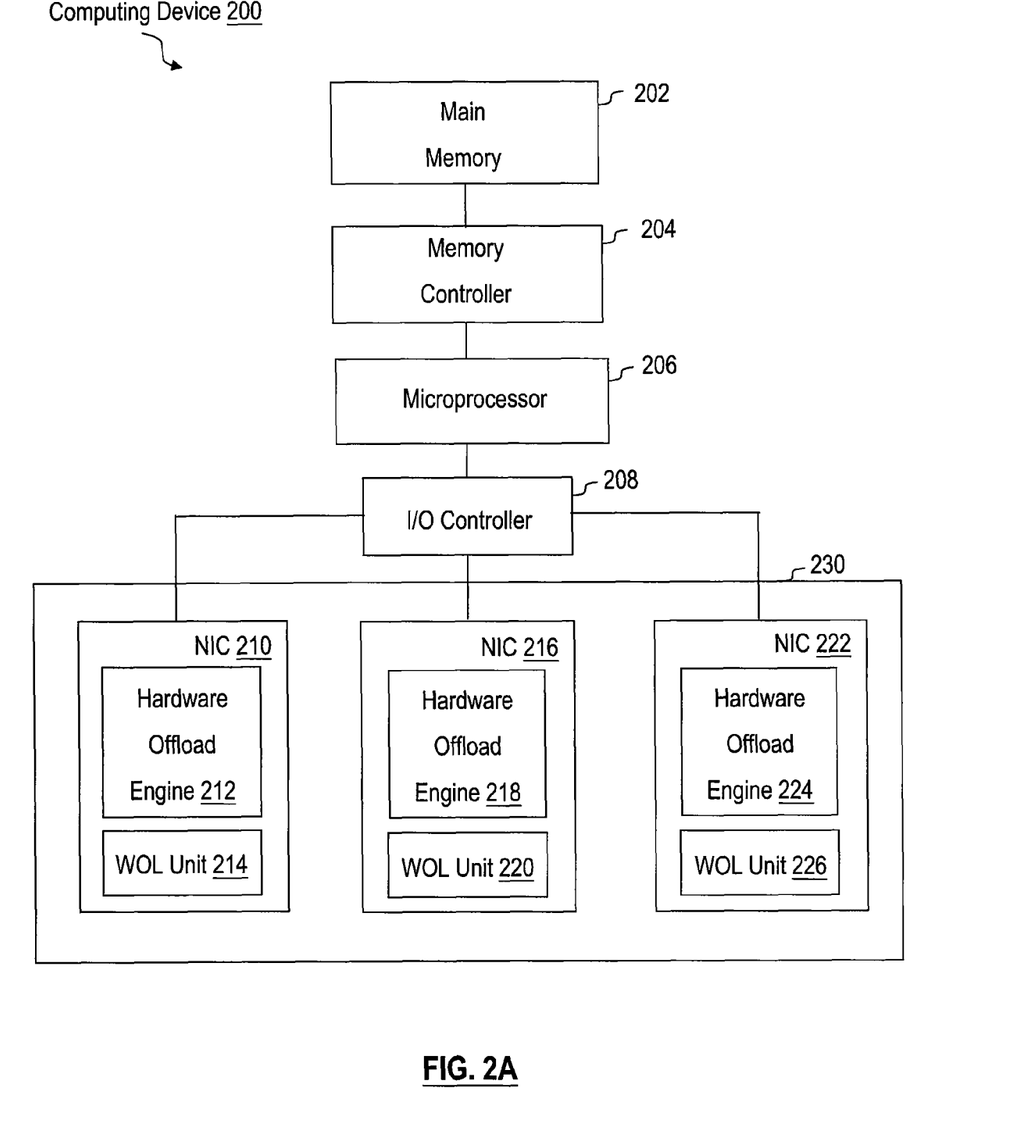
FIG. 2A illustrate a computing device in which one or more aspects of the present invention can be implemented.

FIG. 2A illustrate a computing device 200 in which one or more aspects of the present invention can be implemented. The computing device 200 may be a desktop computer, server, laptop computer, palm-sized computer, personal digital assistant, tablet computer, game console, cellular telephone, or any other type of similar device that processes information. As shown, the computing device 200 includes a main memory 202, a memory controller 204, a microprocessor 206, an I/O controller 208, and NICs 210, 216, and 222. Each of the NICs optionally includes its own hardware off-load engine ("HOE") and WOL unit. The HOE includes logic configured for processing network frames associated with network connections between the computing device 200 and one or more remote network computing devices (not shown) that have been selectively offloaded to the NICs. By processing network frames with HOEs 212, 218, and 224 (sometimes referred to as "handling connections in hardware") rather than performing those processing functions in a host software TCP/IP stack (sometimes referred to as "handling connections in software"), communications between the NICs 210, 216, 222, and the microprocessor 206 as well as computations performed by the microprocessor 206 may be substantially reduced. WOL units 214, 220, and 226 are configured to listen for the aforementioned WOL packets to wake up the computing device 200. Moreover, the NICs are combined in a switch independent load balanced environment and belong to a team 230.

The memory controller 204 is coupled to the main memory 202 and to the microprocessor 206, and the I/O controller 208 is coupled to the microprocessor 206 and the NICs 210, 216, and 222 in the team 230. In one embodiment of the invention, the microprocessor 206 transmits commands or data to the NICs by writing commands or data into the I/O controller 208. Once such commands or data are written into the I/O controller 208, the I/O controller 208 optionally translates the commands or data into a format that the target NIC may understand and communicates the commands or data to the target NIC. Similarly, the NICs 210, 216, and 222 transmit commands or data to the microprocessor 206 by writing commands or data into the I/O controller 208, and the I/O controller 208 optionally translates the commands or data into a format that the microprocessor 206 may understand and communicates the commands or data to the microprocessor 206. The aforementioned couplings may be implemented as memory busses or I/O busses, such as PCI™ busses, or any combination thereof, or may otherwise be implemented in any other technical feasible manner.

Figure 2B:
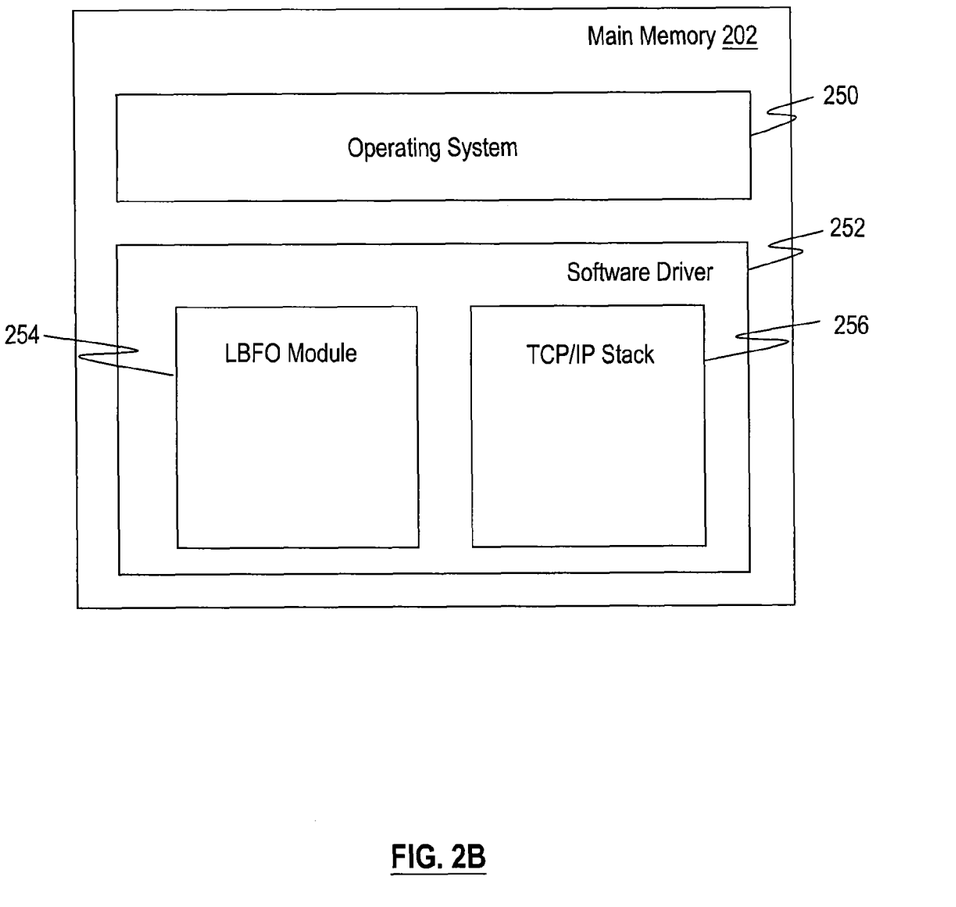
FIG. 2B is a conceptual diagram of the content of the main memory in the computing device of FIG. 2A, according to one embodiment of the present invention.

As shown in more detail in FIG. 2B, the main memory 202 includes an operating system 250 and a software driver 252. The software driver 252 includes a Load Balancing and Failover ("LBFO") module 254 and a TCP/IP stack 256. The LBFO module 254 tracks networking status for each NIC (e.g., the link status of each NIC, the number of send and receive errors on each NIC and/or whether each NIC is sending and receiving keep-alive packets) and communicates with the TCP/IP stack 256 when network connections are being moved from one NIC to another NIC within the computing device 200 of FIG. 2A. The LBFO module 254 intelligently determines how network connections should be distributed across the different functional NICs in the computing device 200, based on the aforementioned networking status of each NIC. The TCP/IP stack 256 maintains a single TCP/IP binding to the team 230, and the individual NICs on the team are transparent to the operating system 250.

Figure 3A:
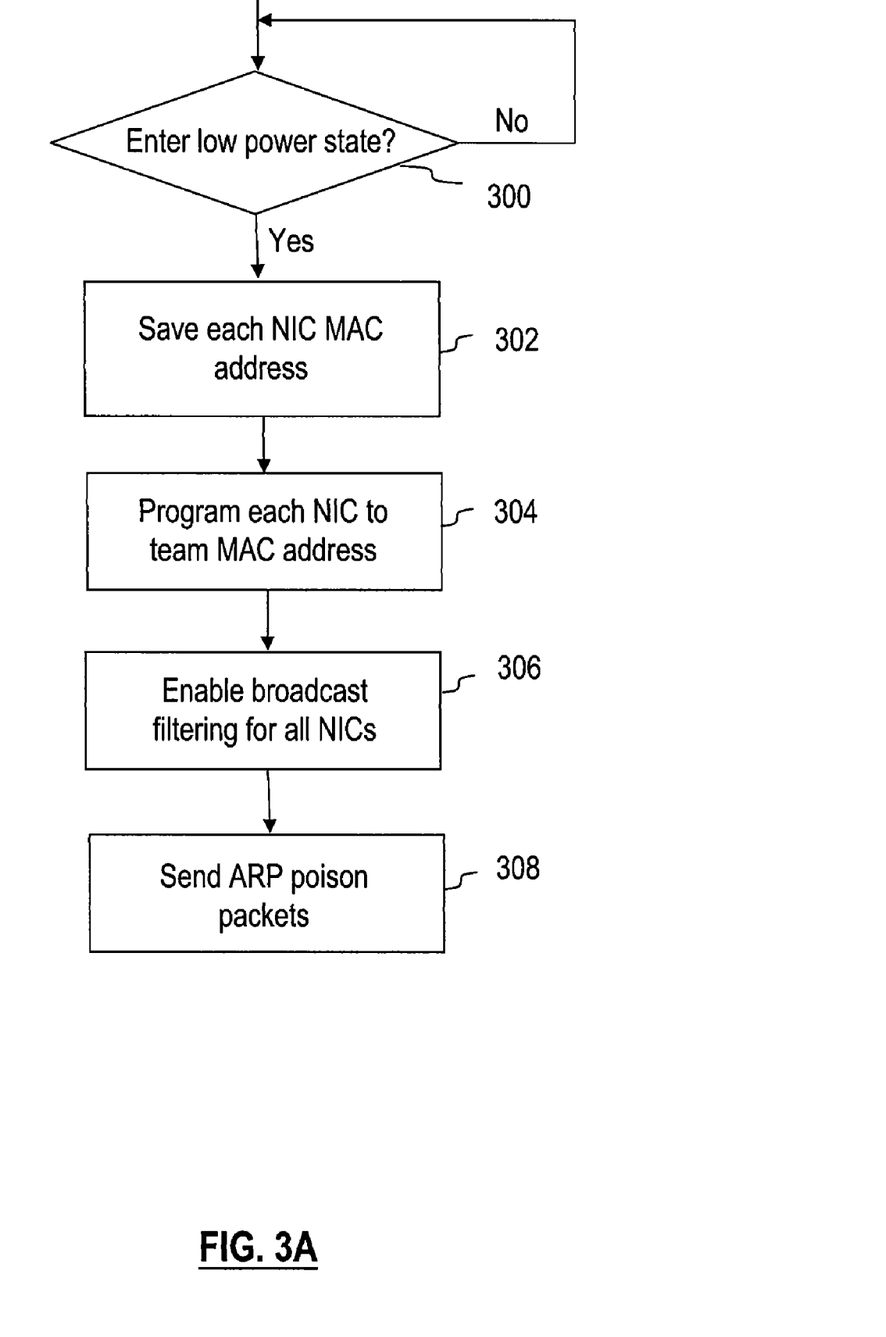
FIG. 3A is a flow chart illustrating the method steps for configuring a team of NICs to address the potential problems of not waking up a target computing device, according to one embodiment of the present invention.

The software driver 252 also includes additional logic to configure the team 230 to handle WOL packets before the computing device 200 enters the low power state. In one implementation, some or all of this logic is provided by the LBFO module 254. FIG. 3A is a flow chart illustrating the method steps for configuring a team of NICs, such as the team 230, to address the potential problems of not waking up a target computing device, such as the computing device 200, according to one embodiment of the present invention. Specifically, in conjunction with FIG. 2A and also FIG. 2B, if the software driver 252 detects that the computing device 200 is about to enter the low power state in step 300, then it causes the MAC addresses of the NIC 210, 216, and 222 to be saved in memory in step 302. In one implementation, the MAC addresses are stored in programmable memory on the NICs. Alternatively, the MAC addresses are stored in memory locations (e.g., registry keys or RAM) accessible to the operating system 250 and/or software driver 252. After the unique NIC MAC addresses are backed up, the software driver 252 then causes these NICs to be programmed with the MAC address of the team 230 in step 304. Optionally, in one implementation, the software driver 252 also enables broadcast filtering for all the NICs in step 306 to avoid relying on a single broadcast-filtering-enabled NIC to handle WOL broadcast packets. Lastly, the software driver 252 sends out address resolution protocol (ARP) poison packets in step 308 to the client devices (not shown in the figures) coupled to the NICs on the team 230 to modify their respective ARP caches to use the MAC address of the team 230.

The ARP protocol includes ARP Request packets and ARP Response packets. To determine the MAC address of a system using this protocol, an ARP Request packet (as a broadcast packet) is sent with the IP address of the system. The true owner of this IP address typically responds with the ARP Response packet directed back to the machine that sent the ARP Request packet. The ARP Response packet includes the MAC address of the system. According to the ARP protocol, if any machine with an ARP cache entry receives another ARP Request packet from a sender that has the same IP address as the one in the cache entry, then the machine should refresh the MAC address in the cache entry. Here, the aforementioned ARP poison packet is like an ARP Request packet with the IP address and the MAC address of the sender as the Team IP address and the Team MAC address, respectively.

To illustrate, suppose the MAC addresses for the NIC 210, 216, and 222 are M1, M2, and M3, respectively, and the MAC address for the team 230 is M3. Following the steps shown in FIG. 3A and described above, before the computing device of FIG. 2A enters low power state, the MAC addresses for the NICs are programmed to M3, and the client devices coupled to the NICs use M3 to send out WOL packets.

Figure 3B:
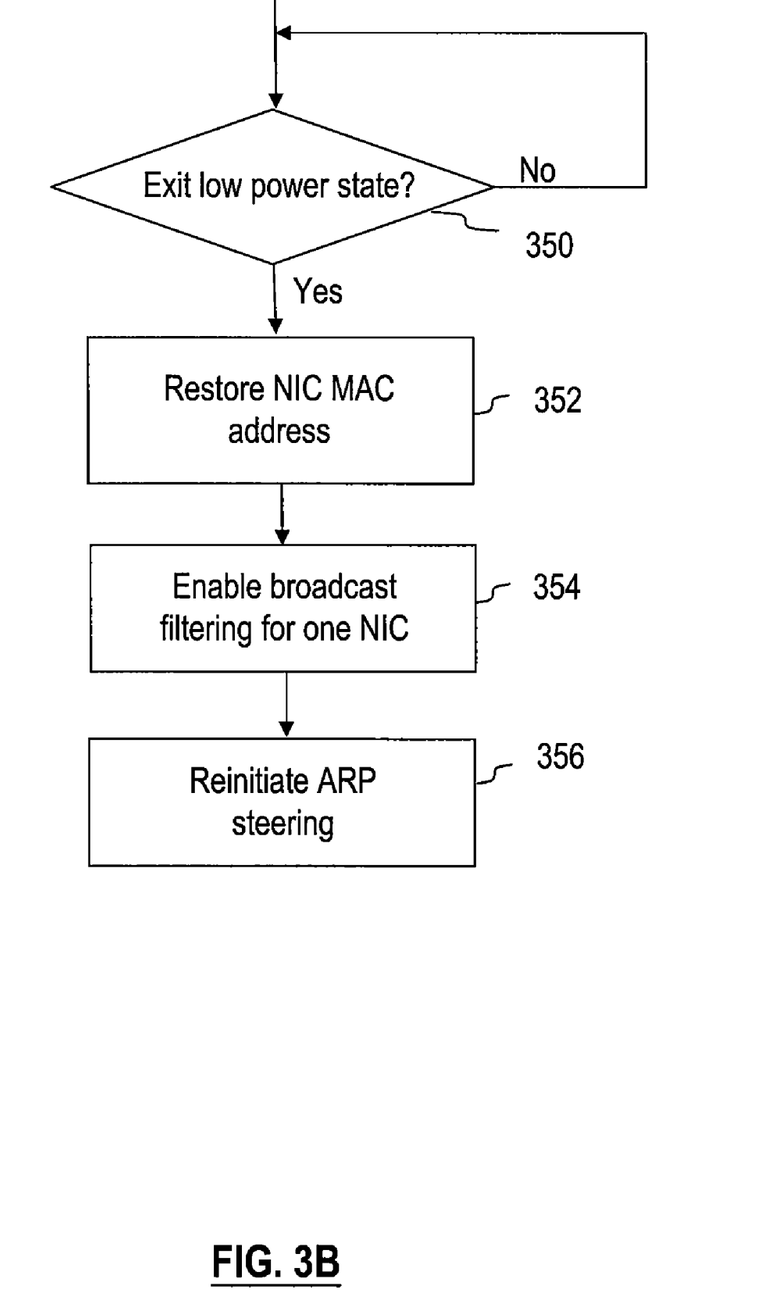
FIG. 3B is a flow chart illustrating the method steps for allowing a team of NICs to resume its operations after exiting the low power state, according to one embodiment of the present invention.

FIG. 3B is a flow chart illustrating the method steps for allowing the team 230 to resume its operations after exiting the low power state, according to one embodiment of the present invention. If the software driver 252 detects that the computing device 200 is exiting the low power state in step 350, it restores the MAC addresses for the NIC 210, 216, and 222 in step 352 by reprogramming the NICs with their unique MAC addresses. Optionally, instead of having the broadcast filtering function enabled for all the NICs on the team 230, in one implementation, the function is enabled for just one NIC in step 354 to avoid unnecessarily handling duplicate packets. Lastly, in step 354, the ARP steering function supported by the software driver 252, which essentially involves intercepting an ARP response packet and modifying the MAC address to for load balancing purposes, is reinstated.

Figure 3C:
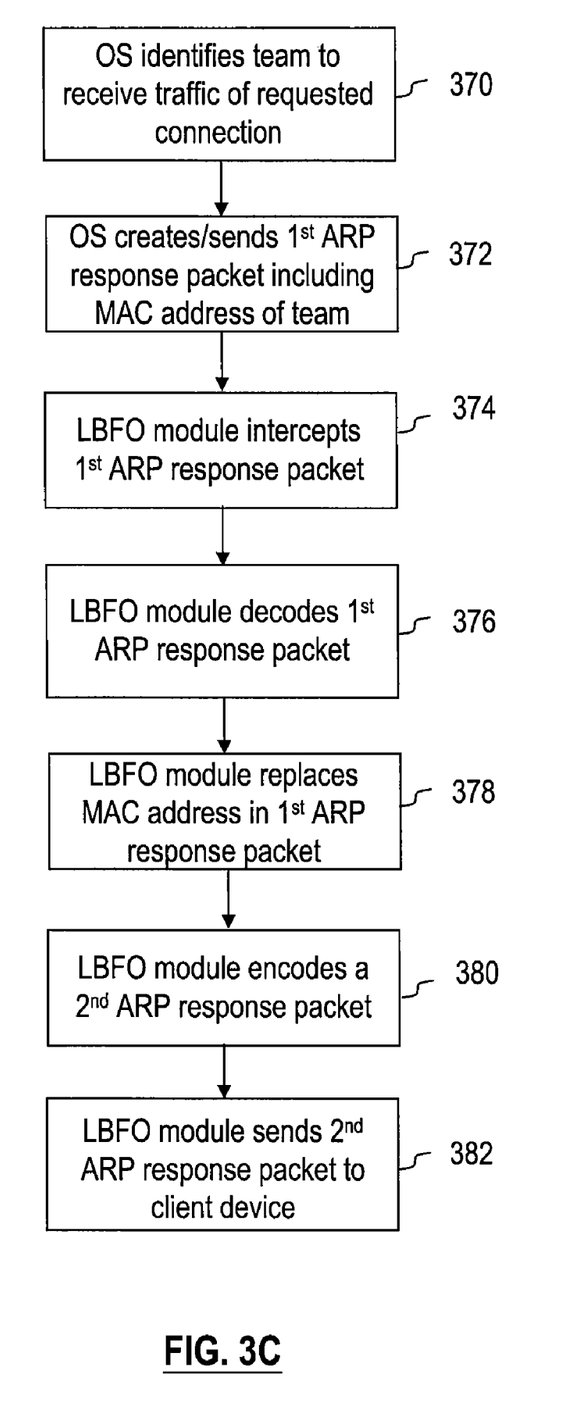
FIG. 3C is a flow chart illustrating the method steps for carrying out the ARP steering function in a team configuration, according to one embodiment of the present invention.

More particularly, FIG. 3C is a flow chart illustrating the method steps for carrying out the ARP steering function in a team configuration, according to one embodiment of the present invention. After the operating system 250 of FIG. 2B receives an ARP request packet from a client device (not shown) to initiate a connection to transmit data to the computing device 200, the operating system 250 identifies the team 230 (since the NICs on the team are transparent to the operating system 250) through which traffic for the connection is to be received in step 370. Continuing with the example above, suppose the MAC address for the team 230 is M3. In step 372, the operating system 250 creates and sends a first ARP response packet, including the MAC address M3, to the team 230.

The LBFO module 254 intercepts the ARP response packet sent from the operating system 250 in step 374 and decodes the intercepted first ARP response packet into components in step 376. After the LBFO module 254 selects the MAC address of the NIC on the team 230, it replaces the MAC address selected by the operating system 250, in the decoded first ARP response packet, with the newly selected MAC address. In step 380, the LBFO module 254 encodes the selected MAC address and the remaining components of the decoded first ARP response packet to form a second ARP response packet. In step 382, the LBFO module 254 transmits the second ARP response packet to the client device. In one embodiment, the second ARP response packet is transmitted through the NIC on the team 320 that corresponds to the selected MAC address.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the above examples, embodiments, and drawings should not be deemed to be the only embodiments, and are presented to illustrate the flexibility and advantages of the present invention as defined by the following claims.

We claim:

1. A method for supporting Wake-on-LAN (WOL) in a team of network interface cards (NICs) in a computing device, the method comprises:
    before the computing device enters a low power state, programming each of the NICs on the team with a team Media Access Control (MAC) address after having backed up the NIC MAC addresses of the NICs;
    causing modification of address resolution protocol (ARP) caches associated with a plurality of client devices coupled to the team of NICs to use the team MAC address;
    after the computing device exists the low power state, programming each of the NICs on the team with the respective backup NIC MAC address; and
    reinitiating an ARP steering process by:
        in response to an ARP request packet from a first client device out of the plurality of client devices, intercepting a first ARP response packet including the team MAC address;
        replacing the team MAC address with the NIC MAC address of one of the NICs on the team to form a second ARP response packet; and
        transmitting the second ARP response packet to the first client device to cause the ARP cache associated with the first client device to be modified to use the NIC MAC address included in the second ARP response packet.

2. The method of claim 1, further comprising enabling broadcast filtering for each of the NICs on the team before the computing device enters the low power state.

3. The method of claim 1, wherein the modifying step further comprising sending an ARP poison packet with the team MAC address to the plurality of client devices.

4. The method of claim 1, further comprising disabling broadcast filtering for some of the NICs on the team so that broadcasting filtering is enabled for only one NIC on the team after the computing device exists the low power state.

5. The method of claim 1, wherein the team of NICs operates in a switch independent load balanced environment.

6. A non-transitory computer-readable storage medium containing a sequence of instructions for a software driver, which when executed by a processor in a computing device, causes the processor to:
    before the computing device enters a low power state, program each network interface card (NIC) on a team that supports Wake-on-LAN (WOL) protocol with a team Media Access Control (MAC) address after having backed up the NIC MAC addresses of the NICs;
    cause modification of address resolution protocol (ARP) caches associated with a plurality of client devices coupled to the team of NICs to use the team MAC address;
    after the computing device exists the low power state, program each of the NICs on the team with the respective backup NIC MAC address; and
    reinitiate an ARP steering process by:
        in response to an ARP request packet from a first client device out of the plurality of client devices, intercepting a first ARP response packet including the team MAC address;
        replacing the team MAC address with the NIC MAC address of one of the NICs on the team to form a second ARP response packet; and
        transmitting the second ARP response packet to the first client device to cause the ARP cache associated with the first client device to be modified to use the NIC MAC address included in the second ARP response packet.

7. The non-transitory computer-readable storage medium of claim 6, further containing a sequence of instructions for the software driver, which when executed by the processor, causes the processor to enable broadcast filtering for each of the NICs on the team before the computing device enters the low power state.

8. The non-transitory computer-readable storage medium of claim 6, further containing a sequence of instructions for the software driver, which when executed by the processor, causes the processor to send an ARP poison packet with the team MAC address to the plurality of client devices.

9. The non-transitory computer-readable storage medium of claim 6, further containing a sequence of instructions for the software driver, which when executed by the processor, causes the processor to disable broadcast filtering for some of the NICs on the team so that broadcasting filtering is enabled for only one NIC on the team after the computing device exists the low power state.

10. The non-transitory computer-readable storage medium of claim 6, wherein the team of NICs operates in a switch independent load balanced environment.

11. A computing device, comprising:
   system memory, including an operating system and a software driver,
   a team of network interface cards (NICs) configured to support Wake-on-LAN (WOL) protocol, and
   a processor configured to:
      before the computing device enters a low power state, program each of the NICs on the team with a team Media Access Control (MAC) address after having backed up the NIC MAC addresses of the NICs;
      cause modification of address resolution protocol (ARP) caches associated with a plurality of client devices coupled to the team of NICs to use the team MAC address;
      after the computing device exists the low power state, program each of the NICs on the team with the respective backup NIC MAC address; and
      reinitiate an ARP steering process by:
         in response to an ARP request packet from a first client device out of the plurality of client devices, intercepting a first ARP response packet including the team MAC address;
         replacing the team MAC address with the NIC MAC address of one of the NICs on the team to form a second ARP response packet; and
         transmitting the second ARP response packet to the first client device to cause the ARP cache associated with the first client device to be modified to use the NIC MAC address included in the second ARP response packet.

12. The computing device of claim 11, wherein the processor is further configured to enable broadcast filtering for each of the NICs on the team before the computing device enters the low power state.

13. The computing device of claim 11, wherein the processor is further configured to send an ARP poison packet with the team MAC address to the plurality of client devices.

14. The computing device of claim 11, wherein the processor is further configured to disable broadcast filtering for some of the NICs on the team so that broadcasting filtering is enabled for only one NIC on the team after the computing device exists the low power state.

* * * * *